United States Patent [19]
Davie et al.

[11] Patent Number: 5,973,665
[45] Date of Patent: *Oct. 26, 1999

[54] TEMPORALLY INVASIVE DISPLAY GUIDE

[75] Inventors: Brian John Davie, Cambridge, Mass.; Timothy Dan Greer, Endicott, N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/745,091

[22] Filed: Nov. 7, 1996

[51] Int. Cl.⁶ ........................................ G09G 5/22
[52] U.S. Cl. ................................ 345/141; 345/145
[58] Field of Search .................... 345/156, 157, 345/145, 146, 141, 143, 163, 168, 112, 113, 115, 114, 347, 350, 351, 352, 354

[56] References Cited

U.S. PATENT DOCUMENTS

| | | | |
|---|---|---|---|
| 4,616,336 | 10/1986 | Robertson et al. | 364/900 |
| 4,698,625 | 10/1987 | McCaskill et al. | 345/157 |
| 4,739,318 | 4/1988 | Cohen | 340/750 |
| 4,763,356 | 8/1988 | Day et al. | 379/368 |
| 5,010,495 | 4/1991 | Willetts | 364/513.5 |
| 5,214,719 | 5/1993 | Budd et al. | 382/23 |
| 5,220,625 | 6/1993 | Hatakeyama et al. | 345/347 |
| 5,235,654 | 8/1993 | Anderson et al. | 382/61 |
| 5,251,268 | 10/1993 | Colley et al. | 382/14 |
| 5,339,391 | 8/1994 | Wroblewski et al. | 395/157 |
| 5,355,307 | 10/1994 | Scharnhorst | 364/188 |
| 5,418,718 | 5/1995 | Lim et al. | 364/419.16 |
| 5,613,909 | 3/1997 | Stelovsky | 463/1 |

OTHER PUBLICATIONS

R.K. DeBry, et al. "Enhanced Display Extended Character and Graphics Functions," IBM Technical Disclosure Bulletin (TDB) vol. 23, No. 5, Oct. 1980, pp. 2003–2004.

I.H. Hernandez, et al. "Interactive Spelling Correction Aid for a Text Processing System," IBM TDB vol. 25 No. 8 Jan. 1983 pp. 4227–4228.

Weisert, "Macros for Defining C++ classes". in Sigplan Not. (USA) v. 27 N. 11 pp. 67–76 Nov. 1992. INSPEC abstract INSM 4314573.

Howell, et al. "Use of Dual–Purpose Appearance Control Codes in Text Strings". IBM TDB v25 N 3B p. 1561–2 Aug. 1982.

Cutts, et al. "Gale". Int. J. Bio–Med Comput (Ireland) v31 N 2 p. 141–50 Aug. 1992. INSPEC abstract AN 4248201.

Katz, et al. "Laserdisc Technology in Computerized Information Systems." May 1987, Univ. Calgary. p. 145. INSPEC abstract AN B88000090, C88005017.

Muldner et al. "CAE–Computer Aided Envronment," in Computers in Education. Proceedings of the IFIP TC3 4th World Conf–WCCE 85 p. 187–92. INSPEC Abstract AN C86036319.

Prosser, "Hi Lister—a study and teaching aid." Micro (USA) N. 73 p. 347 Jul. 1984 INSPEC abstract AN C84051961.

Ahlers, K. "Read–My–Lips" in Proceedings of the John Hopkins National Search for Computing Applications to Assist Persons with Disabilities. IEEE Comp Soc Press (1992) pp. 7–9. INSPEC abstract AN 4372929.

*Primary Examiner*—Xiao Wu
*Attorney, Agent, or Firm*—Shelley M. Beckstrand

[57] ABSTRACT

Method and apparatus for controlling a display device displaying a plurality of display elements, such as character strings, fields, icons, buttons and so forth. Responsive to user entry of a display indicia, such as a character string entered at a keyboard, or a field or button activated at the screen by a cursor or mouse pointer, determining if at least one display element corresponds to the display indicia; and if so temporarily highlighting that display element.

12 Claims, 4 Drawing Sheets

TEMPORALLY INVASIVE DISPLAY GUIDE

BACKGROUND OF THE INVENTION

1. Technical Field of the Invention

This invention pertains to a method for controlling a computer display. In particular, this invention provides for temporarily highlighting prior instances of displayed input.

2. Background Art

Sometimes a relatively inexperienced computer user will be observing a more experienced user, attempting to learn by watching. The experienced user will be interacting with the computer and may fail to completely explain the reason for each command typed. The inexperienced user may be unable to keep up. One particular problem occurs when the experienced user sees something on the screen and uses it as input to a command. The inexperienced user needs to see the text in the command, recognize it as potentially coming from data that is already on or has just previously been on the screen somewhere, and locate it on the screen. The time and effort required to do that inhibits learning on the part of the inexperienced user or slows down the experienced user.

Typically, a personal computer (PC) is connected to a host computer and displays a terminal emulation session 150. A person interacts with the host computer via the PC's terminal emulation program. When the person types something on the emulation screen, it is desirable to spotlight numbers or other special data elsewhere on the screen when it matches what the person has just entered. The reason for this desirability is that while the person presumably obtained the data from the screen, other people trying to watch and learn may not know this unless the source of the data is pointed out to them.

Consequently, there is a need in the art for hastening human recognition of on-screen data that is being used in an interactive situation, and to do so in a relatively non-intrusive manner.

It is an object of the invention to facilitate faster human recognition of on-screen data without significantly slowing down the operation of a computer display by experienced users.

SUMMARY OF THE INVENTION

The invention provides a method and apparatus for controlling a display device displaying a plurality of display elements, comprising the steps of receiving a display indicia; determining if at least one display element corresponds to the display indicia; and if so temporarily highlighting that display element.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
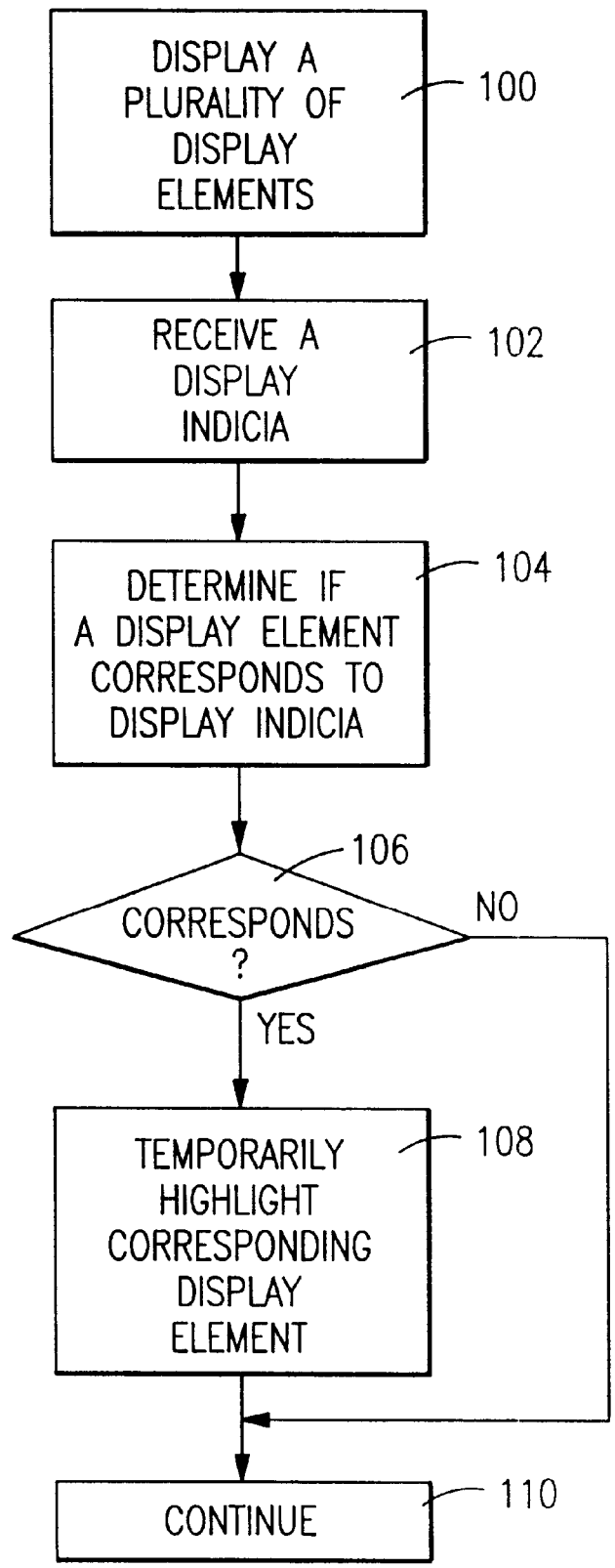
FIG. 1 is a flow diagram representation of the method of the invention.

Referring to FIG. 1, a flow chart representation of the method of the invention is shown for temporarily highlighting a display element on a display panel which corresponds to a display indicia subsequently entered. Such highlighting may take several forms, including flashing cursor, bold text, reverse video, blanking out, replacing with diagonal lines, changing color, and so forth. Highlighting of images may be accomplished by the above, or by complementing all or a portion (such as the outer ten pixels, creating a frame) of the bit pattern, so as to make the image noticeable without making it unrecognizable, taking up space outside the image, or requiring much processing.

In step 100, a plurality of display elements constituting a display panel are displayed on, say, a computer terminal screen. Such display elements may be character strings, fields, icons, buttons, and so forth. In step 102, the terminal user enters characters on a character screen, positions a cursor, or clicks a mouse to enter a new display indicia. In steps 104 and 106, the display indicia is compared with the plurality of display elements to identify at least one display element corresponding to the display indicia, if one such exists. In step 106, the display panel is operated to temporarily highlight the corresponding display element. In step 110, operation of the terminal display continues as the temporarily highlighted display element returns to normal. A display indicia may be a character string entered at a keyboard with delimiters parsed out, a character string following one of a set of command strings, or a character string selected from a predetermined data type or range.

Figure 2:
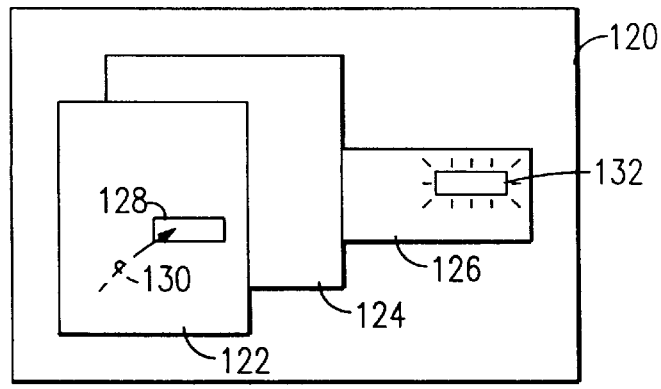
FIG. 2 is an illustration of the use of the invention for temporarily highlighting a display element in a non-current window.

Referring to FIG. 2, display 120 is shown with current or active window 122, and prior or inactive windows 124 and 126. As illustrated, the operator of the terminal positions cursor 130 at field 128 and clicks, thus identifying the content of field 128 as the display indicia. In response thereto, the temporally invasive display application method of the invention identifies a corresponding display element 132 in window 126 and temporarily highlights it. Similarly, display indicia field 128 may be identified by positioning a cursor.

Figure 3:
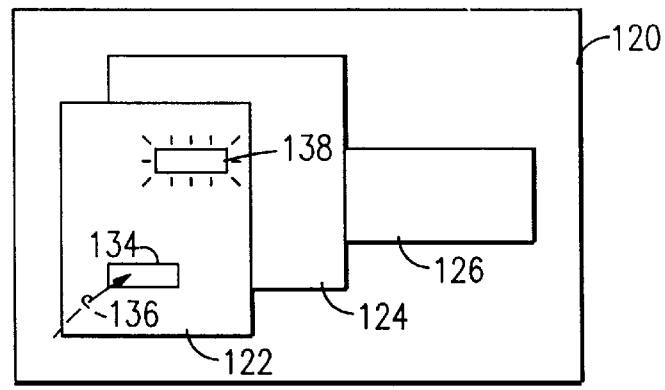
FIG. 3 is an illustration of the use of the invention for temporarily highlighting a display element in a blocked portion of a non-current window.

Referring to FIG. 3, window display 122 contains a field 134 which, upon selection by cursor or pointer 136 is identified as the display indicia. A corresponding display element 138 is located in window 124, and blocked from view by window 122. In accordance with the invention, display element 138 may be temporarily brought into view and highlighted, with or without first positioning or scrolling window 124 to bring display element out from behind window 122.

Figure 4:
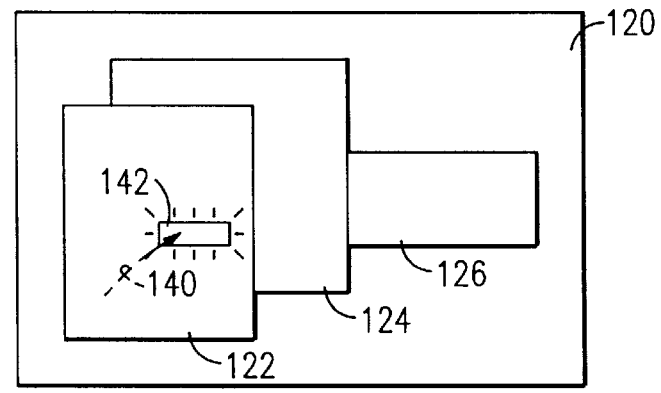
FIG. 4 is an illustration of the use of the invention for temporarily highlighting a cursor field or mouse pointer when the mouse is clicked.

Referring to FIG. 4, field 142 or mouse pointer 140 is temporarily highlighted as the cursor is brought to rest upon it or the mouse is clicked.

Figure 5:
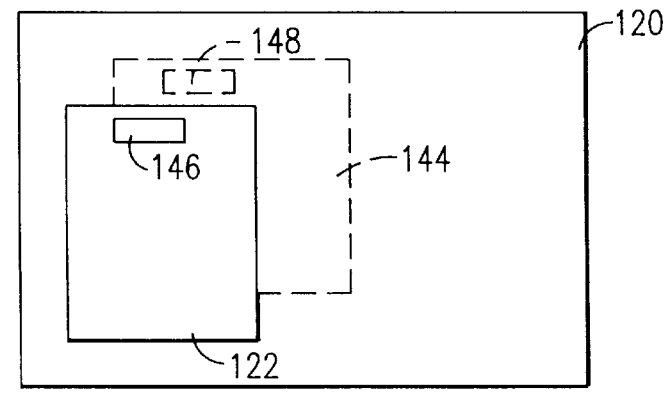
FIG. 5 is an illustration of the use of the invention for temporarily highlighting by fading out a previously current window.

Referring to FIG. 5, in accordance with another embodiment of the invention, prior window panel 144 gradually fades away (unless halted), thus being only temporarily in view as window 122 becomes the active window. Optionally, field 148, where the cursor rested or the mouse was clicked, causing control to pass from window 144 to window 122, is highlighted as window 144 fades.

Figure 6:
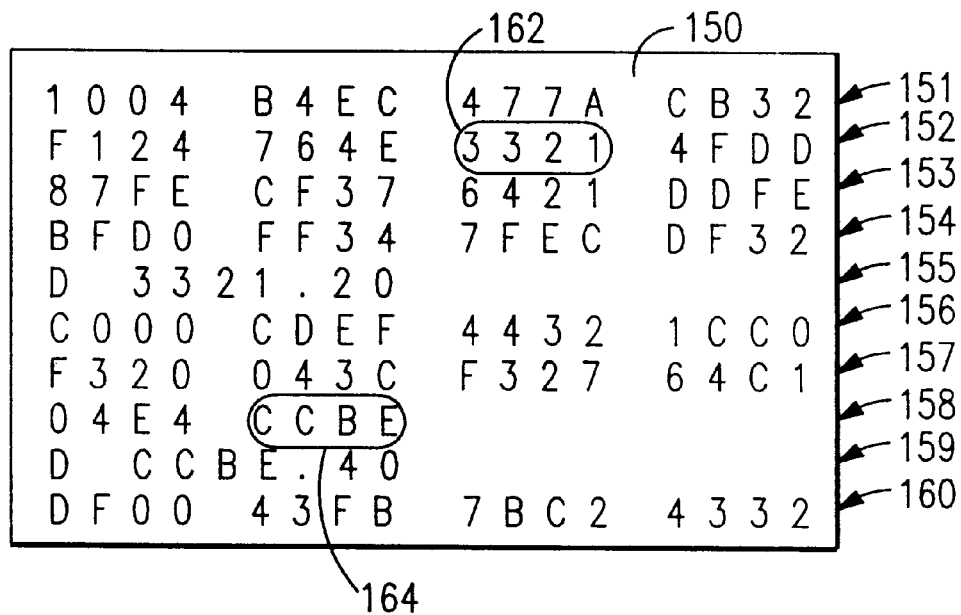
FIG. 6 is an illustration of a display screen showing temporary highlighting of previously entered screen elements.

Referring to FIG. 6, a personal computer (PC) is connected to a host computer and displays a terminal emulation session 150, which in this illustration includes ten display lines 151–160. A person interacts with the host computer via the PC's terminal emulation program. In this specific example, lines 151 through 154 represent the display, in hexadecimal notation, of the contents of sixteen general purpose registers. The experienced user using the terminal recognizes that register 7 (on line 152 at position 162) contains the address of twenty bytes of data of interest to him, and enters at the terminal keyboard the information displayed on the terminal at line 155: D 3321.20, meaning display the 20 bytes of information beginning at memory location hex 3321.

In accordance with this invention, for example as an aid to an inexperienced user attempting to understand the operation being performed by the experienced user, location 162 is identified as containing a subset of the information entered at line 155, or 3321, and temporarily highlights it. In this case, the display indicia, or subset of interest, does not include the command "D" (meaning display) or the ".20" meaning 20 bytes of data, and such would be accommodated in the method of the invention by personalizing the identification of the display indicia for each command type.

Continuing, the experienced user examines the twenty bytes of hex data displayed at lines 156–158 in response to his command D 3321.20, and recognizes that the last two bytes 164, hex CCBE, point to the next location of interest, and he enters D CCBE.40 at the keyboard, which is consequently displayed at line 159, to retrieve forty bytes from that location. The first of these forty bytes are shown in the display at line 160. As D CCBE.40 is entered at the keyboard, in accordance with this example, the method of the invention identifies corresponding field 164 and temporarily highlights it for the benefit of the inexperienced user—who is enabled thereby to follow more quickly and surely the operation of the terminal by the experienced user. This is useful, also, when two experienced users are debugging, for example, a computer program, and one of the users is at the keyboard while the other observes the program code as it is displayed.

Figure 7:
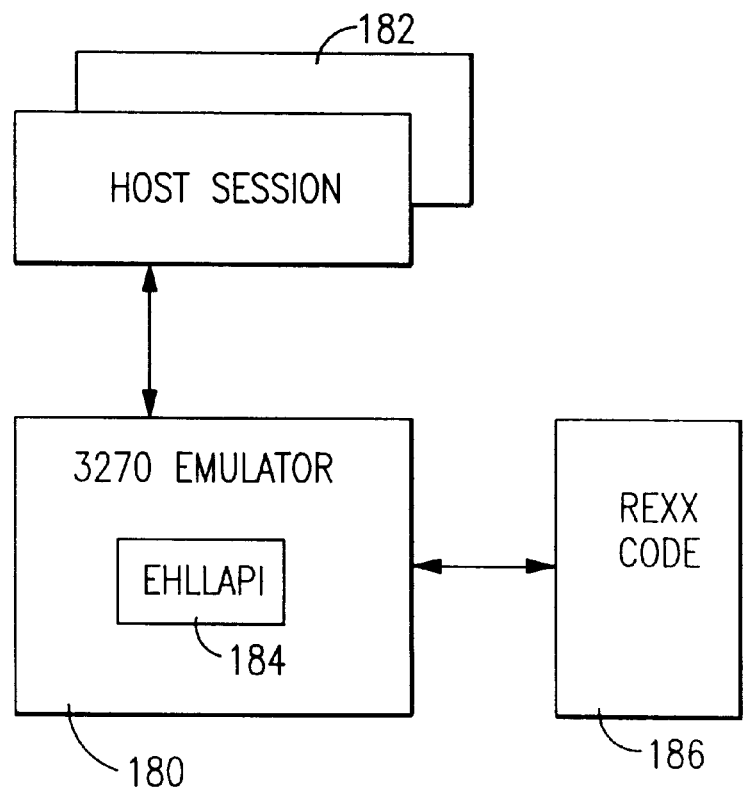
FIG. 7 is a block diagram of a preferred embodiment of the system of the invention.

Referring to FIG. 7, a terminal 180, such as an IBM 3270 terminal emulator, is connected to a selected host session 182 and includes a REXX code application program 186 and EHLLAPI program 184. EHLLAPI 184 maintains the display buffer for display 150 (FIG. 6). REXX code 186 implements the method described hereafter in connection with FIG. 8 and Table 1. In this code 186, the operation of the host code is replicated so that the last command entered is displayed by emulator 180: STUFF becomes OLDSTUFF, as will be described hereafter, with OLDSTUFF representing the part of interest in the last command, or the display indicia of FIG. 1 (with periods parsed out.)

Figure 8:
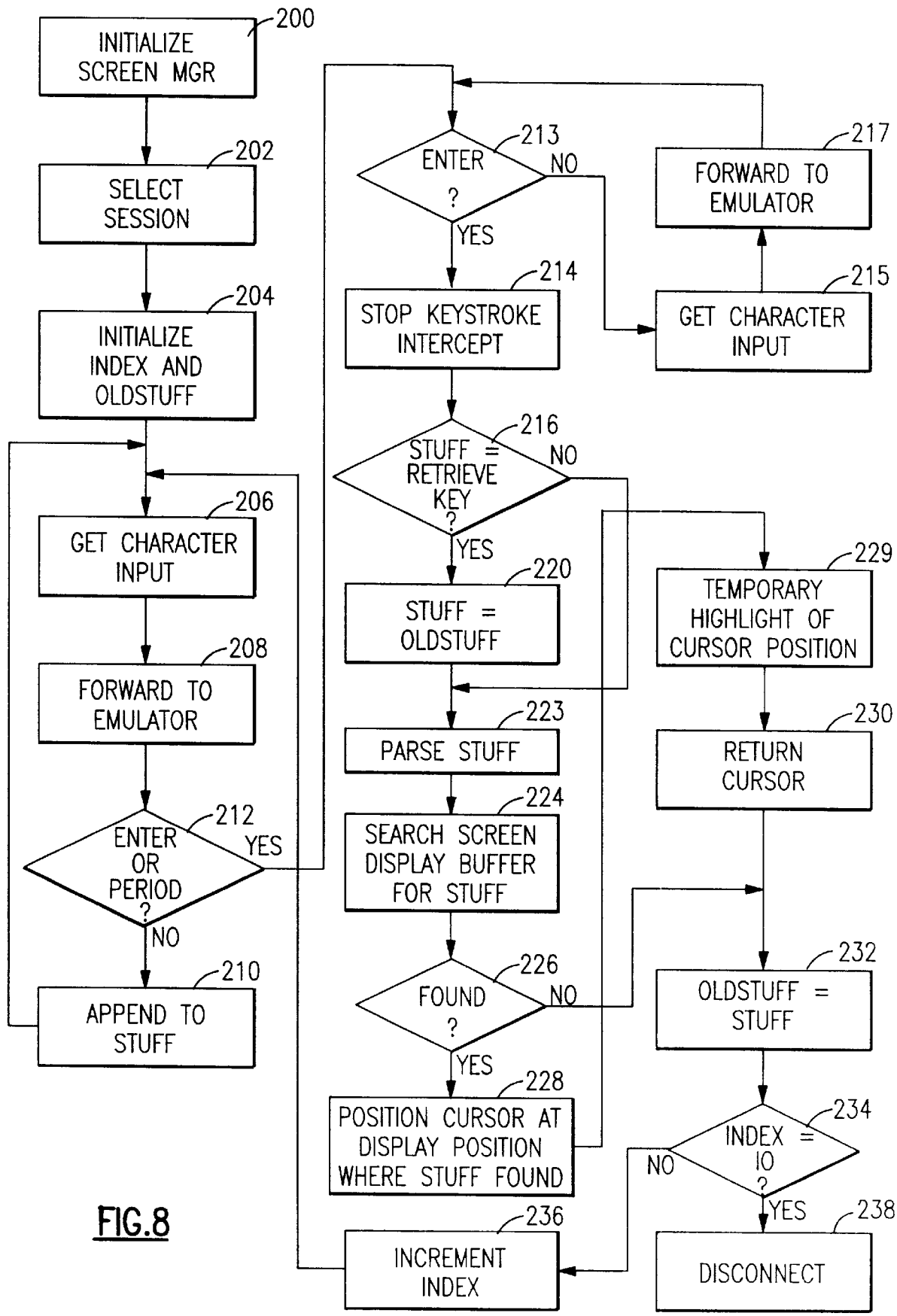
FIG. 8 is a flow diagram representation of a preferred embodiment of the method of the invention.

Referring to FIG. 8, one embodiment of the method of the invention is set forth. In step 200, a screen manager is initialized, in step 202 a session is selected, and in step 204, INDEX and OLDSTUFF are initialized. Alternatively, at this point in the process, initialization may include defining whether to highlight the first, last, all, or some number of instances of display elements corresponding to the display indicia (STUFF). In steps 206, 208, 212, and 210, the string STUFF is built by reading and forwarding characters to the emulator and appending characters other than ENTER or PERIOD ".".

When ENTER or PERIOD is detected at step 212, in steps 213, 215 and 217 character input is obtained and forwarded to the emulator, but the building of display indicia STUFF is terminated. When a PERIOD is detected in steps 212 and 213, in step 214 keystroke intercept is halted. In step 220 STUFF is set equal to OLDSTUFF if, in step 216, STUFF was determined to be the retrieve key. Step 216 is used to recall the last the command entered. In step 223, STUFF is parsed to replace STUFF with some subset of itself in order to distinguish command parameters to ignore from command parameters to identify display elements for highlighting. (Specifically, in the program code of Table 1, only the last word of STUFF is kept, and then only the hexadecimal portion of that is examined.) In steps 224 and 226, the screen buffer is searched for a display element corresponding to STUFF. Steps 224, 226 and 228 may be modified to identify and highlight the last, first, all, or some predetermined number of instances of display elements corresponding to a display indicia. If STUFF is found, in step 228 the cursor is temporarily positioned at the corresponding display element and then, in step 230, returned to the command line or current position. In the interim, in step 229, the cursor position is temporarily highlighted. (In the embodiment of Table 1, this is done by cycling the cursor through its four permitted forms, including underline, box, blinking underline, and blinking box, ending with the same cursor form as before.) If not found, and upon return of the cursor, OLDSTUFF is set equal to STUFF, and in step 234 INDEX is examined to see if processing should continue. (In this example embodiment, INDEX is set equal to 10, but obviously could be set equal to any predetermined number or variable optionally selected by the operator at initialization.) If the index has not expired, it is incremented in step 236 and processing returns to step 206 to get the next character. If the index has expired, in step 238 this specific embodiment of the invention is disconnected.

In operation, in accordance with the embodiment of FIG. 7, a program running on a personal computer uses a High Level Language Application Programming Interface (HLLAPI) to capture keystrokes as they are entered on the host session, relaying them to the host that is the session owning the display, also referred to as the owner application, and as they are captured. When the user presses ENTER, these keystrokes are examined for appropriate indications of data. For example, variations of the DISPLAY STORAGE command might be scanned for. If the input is determined to be of a type that some of the data might appear on the screen, the input is further parsed to find a candidate, or display indicia. With DISPLAY STORAGE, for example, the beginning storage address is determined. Then the PC program scans the screen (other than the command just entered, and selected or predetermined parameters), looking for instances (that is, display elements) of the candidate text (that is, display indicia) being displayed.

If the candidate text is not found, either because no candidate could be determined or because the candidate selected did not appear on the screen, the program does nothing except to resume capturing keystrokes. If the candidate text is found, the PC program moves the cursor to the location where the text was found, and causes the cursor position marker to cycle through its various possible appearances for one to two seconds. Relaying of captured keystrokes is delayed during this time, so that the user can successfully type ahead, but the typing will not interfere with this temporal marking of the text location. After cycling the cursor position marker, the program returns the cursor to its previous position and resumes observing and relaying captured keystrokes.

Referring to Table 1, REXX language code is provided for one embodiment of the invention, primarily corresponding to that of FIGS. 7 and 8.

Descriptions of the various functions used in the code listing of Table 1, are as follows:

PSCURPOS returns the cursor position of the currently connected presentation space in the REXX variables ROW and COLUMN, and the HLLAPI return code in the REXX variable APIRC.

SEARCH searches the currently connected presentation space for the argument string. It loads the HLLAPI function call number and then calls HLLAPI with the sought for string. REXX variables ROW and COLUMN are set with the ROW and COLUMN where the string was found. Returns codes are '1' if the string was found, otherwise '0'.

RESERVEPS issues a HLLAPI RESERVE on the currently connected presentation space (3270 console) inhibiting manual input. It loads the HLLAPI function call for RESERVE presentation space, and then calls HLLAPI and returns whatever return code HLLAPI sets.

RELEASEPS issues a HLLAPI RELEASE on the currently connected presentation space (3270 console) allowing manual input after a RESERVE command.

SETCURS positions the cursor within the currently connected presentation space to SETROW and SETCOL. The return code "1" indicates the cursor is set, otherwise "0".

Stop_Keystroke_Intercept ends the application program's ability to intercept keystrokes for the session_id. The Stop_Keystroke_Intercept function cancels the preceding Start_Keystroke_Intercept function call.

Get_Key allows the application program to intercept keystrokes from the specified session_id, or from the currently connection session if session_id is blank. The program waits until a keystroke becomes available.

Intercept_Status informs the session_id when a keystroke obtained through the Get_Key function was accepted or rejected.

Sendkey sends a keystroke or a string of keystrokes to the currently connected host presentation space. The string parameter defines the set of keystrokes which are sent.

Start_Keystroke_Intercept filters any keystrokes sent to the session specified by the session_id. The intercepted keystrokes are then processed by the Get_Key and Intercept_Status functions.

Connect connects the REXX application program to the host presentation space—the session window having the single-character short name session_id.

Disconnect disconnects the application program from the currently connected session.

In accordance with the embodiment of Table 1, the cursor jumps to a particular position temporarily. This program watches for VM CP commands to display or otherwise manipulate a storage address. Alternatively, for example, CICS or MVS commands could be used. When it sees such a command, it looks for the address elsewhere on the screen. If the address is found elsewhere on the screen, it is highlighted briefly. For example, the user might type D T35BC0.200. If the characters "35BC0" already appear somewhere on the screen, the program of Table 1 will briefly highlight the first occurrence of "35BC0". Alternatively, whatever people enter at a keyboard or select in a display may be selected for temporary highlighting, or otherwise to alert a user that he is entering the same characters as already on the display.

In step 200, program 186 is initialized by calling several screen manager functions supplied by the communications manager 184 in the 3270 emulator 180, where "hllapi" refers to the high level language application programming interface:

arg OPERSESS.
if rxfuncquery('hllapi') then
call rxfuncadd 'hllapi', 'saahlapi', 'hllapisrv'

In the next lines, steps 202 and 204, inasmuch as the user may be logged on to several VM sessions, the VM session is selected for this instance of the operation of the program, OLDSTUFF is initialized, and the outermost do loop is entered at step 206. In this embodiment, the program will terminate (steps 234, 238) after the ENTER key is pressed ten times—obviously, other mechanisms may be employed for terminating operation of the program.

call connect(OPERSESS)
OLDSTUFF=""
do I=1 to 10

In the next lines, the outer do loop of steps 206, 208 is started by watching for input of the first character, and forwarding it on to the emulator. After the first character is detected, processing continues at the do loop in the following section of code.

X=HLLAPI('Start_Keystroke_Intercept', OPERSESS, 'L')
X=HLLAPI('Get_key', OPERSESS)
Y=HLLAPI('Intercept_Status', OPERSESS, 'A')
Y=HLLAPI('SendKey', X)
STUFF="

The following do loop, steps 212 and 210, reads the entered character X, appends it to the string in STUFF, and terminates when the period '.' or ENTER '@E' key is detected.

do while X\='@E' & X\='.'
STUFF=STUFF || X
X=HLLAPI('Get_key', OPERSESS)
Y=HLLAPI('Intercept_Status', OPERSESS, 'A')
Y=HLLAPI('SendKey', X) end In the next several lines, steps 213, 215, 217 and 214, if a period '.' is detected, subsequent keys are forwarded on to the emulator without going through the display search routine, infra, and the keystroke intercept activity is halted when the ENTER key '@E' is read.

if X='.' then do while X\='@E'
X=HLLAPI('Get_key', OPERSESS)
Y=HLLAPI('Intercept_Status', OPERSESS, 'A')
Y=HLLAPI('SendKey', X) end
X=HLLAPI('Stop_Keystroke_Intercept', OPERSESS)

The next section of code, steps 216 and 220, is used in response to the RETRIEVE key '@c'. When actuated, the RETRIEVE key calls up for display the last string entered (a superset of OLDSTUFF). This embodiment of the invention provides for reading that retrieved string into STUFF for parsing.

if STUFF='@c' then STUFF=OLDSTUFF

In this embodiment, which is designed specifically for parsing the display command, such as D T35BC0.200, the string STUFF being parsed in step 223 is converted to upper case, periods '.' and dashes '-' are converted to spaces, and all non-hex characters are eliminated. Thus, in step 223, STUFF is parsed to replace STUFF with some subset of itself in order to distinguish command parameters to ignore from command parameters to identify display elements for highlighting. (Specifically, in the program code of Table 1, only the last word of STUFF is kept, and then only the hexadecimal portion of that is examined.)

STUFF=word(STUFF, words(STUFF))/* Get last word */
STUFF=translate(STUFF)/* Uppercase it */
STUFF=translate(STUFF, '', '-.')/* Convert . and -*/
STUFF=word(STUFF, 1)/* Get first word */
do while datatype(STUFF, 'X')=0 & length(STUFF)>1/* Eliminate T, etc.*/
STUFF=right(STUFF, length(STUFF)−1) end Processing now continues in step 224 by searching the screen display buffer for a string corresponding to the hex string in STUFF. When found, step 226, the cursor is positioned in step 228 at the display position where STUFF was found, and key input blocked while the cursor is at that position. The alternate cursor is called four times to temporarily highlight the display position where STUFF was found (in this case, about two seconds), and then in step 230 the cursor is returned to its data input position (in this case, for a 42 line display, to line 42). In this embodiment, the string just entered is displayed on line 42, so line 42 is excluded from the search. While, in this case, the alternate cursor is displayed to highlight the string corresponding to the hex string in STUFF, an alternative embodiment could use reverse video. Also, an additional alternative embodiment would sound a bell to signal a find.

```
if datatype(STUFF, 'X') = 1 then do
    call PSCURPOS
                /* Save old cursor position */
    ROWOLD = ROW
    COLOLD = 1
    X = SEARCH(STUFF)
                /* Look for STUFF */
    if X\=0 & ROW<42 then do
                /* Found it! Go highlight. */
        call RESERVEPS
                /* Block manual entry */
        X = SETCURS(ROW'-'COLUMN)
        call key_in '@$'
                /* Change to alternate cursor */
        call key_in '@$'
                /* Change to alternate cursor */
        call key_in '@$'
                /* Change to alternate cursor */
        call key_in '@$'
                /* Change to alternate cursor */
        X = SETCURS(ROWOLD'-'COLOLD)
                /* Return to old cursor position */
        call RELEASEPS
                /* Allow manual entry again */
    end
end
OLDSTUFF = STUFF
end
call disconnect
```

TABLE 1

```
arg OPERSESS .
if rxfuncquery('hllapi') then call rxfuncadd
'hllapi','saahlapi','hllapisrv'
call connect(OPERSESS)
OLDSTUFF = ""
```

TABLE 1-continued

```
do I=1 to 10
    X = HLLAPI('Start_Keystroke_Intercept', OPERSESS, 'L')
    X = HLLAPI('Get_key', OPERSESS)
    Y = HLLAPI('Intercept_Status', OPERSESS, 'A')
    Y = HLLAPI('SendKey', X)
    STUFF = ''
    do while X \= '@E' & X \= '.'
        STUFF = STUFF || X
        X = HLLAPI('Get_key', OPERSESS)
        Y = HLLAPI('Intercept_Status', OPERSESS, 'A')
        Y = HLLAPI('SendKey', X)
    end
    if X='.' then do while X \= '@E'
        X = HLLAPI('Get_key', OPERSESS)
        Y = HLLAPI('Intercept_Status', OPERSESS, 'A')
        Y = HLLAPI('SendKey', X)
    end
    X = HLLAPI('Stop_Keystroke_Intercept', OPERSESS)
    if STUFF = '@c'then STUFF = OLDSTUFF
    STUFF = word(STUFF, words(STUFF))
    STUFF = translate(STUFF)
    STUFF = translate(STUFF, ' ', '-.')
    STUFF = word(STUFF, 1)
    do while datatype(STUFF, 'X')=0 & length(STUFF)>1
        STUFF = right(STUFF, length(STUFF)-1)
    end
    if datatype(STUFF, 'X') = 1 then do
        call PSCURPOS
        ROWOLD = ROW
        COLOLD = 1
        X = SEARCH(STUFF)
        if X\=0 & ROW<42 then do
            call RESERVEPS
            X = SETCURS(ROW'-'COLUMN)
            call key_in '@$'
            call key_in '@$'
            call key_in '@$'
            call key_in '@$'
            X = SETCURS(ROWOLD'-'COLOLD)
            call RELEASEPS
        end
    end
    OLDSTUFF = STUFF
end
call disconnect
```

ADVANTAGES OVER THE PRIOR ART

Advantages of the apparatus and method of the preferred embodiment of this invention include providing substantially non-intrusive, temporary highlighting of display elements responsive to entry of new display indicia, so as, for example, to facilitate communication between an experienced user and a non experienced observer of a terminal or work station.

ALTERNATIVE EMBODIMENTS

It will be appreciated that, although specific embodiments of the invention have been described herein for purposes of illustration, various modifications may be made without departing from the spirit and scope of the invention.

In particular, in accordance with an alternative embodiment, the temporally invasive highlighting of textual information can be used to provide an interactive critique of a person's own writing style by temporarily highlighting multiple uses of the same word inca sentence or paragraph as it is entered.

In accordance with yet another embodiment, in the event that information constituting a display indicia is entered which compares with a display element from a previous screen or no longer visible window or window portion, the display is operated to scroll up to the display element to temporarily highlight it and scroll back to the current display position, or pull into view a previously displayed window and, if necessary, scroll the display element into the visible portion of that previously displayed window to temporarily highlight the display element and then return to the current view position.

In yet another embodiment, the length of time that a display element is highlighted, or that a previously current display window is popped up, may be varied by appropriate initialization of the temporally invasive application program, or by the user during execution thereof.

Similarly, in yet another embodiment, temporally invasive operation of the display panel may be actuated at the request of the user or in response to an erroneous entry of a command or data. Also, an additional visual or sound indication may be given if a corresponding display element is, or is not, identified. In yet another embodiment, correspondence is identified through use of a fuzzy search. In still a further alternative embodiment, a function key or icon may be provided that toggles enable/disable of the temporally invasive function of the invention.

Also, in accordance with yet another embodiment, a display element selected in a first window that causes a second window to open as the current window may be temporarily highlighted, thus enabling the user to understand or remember what he did in getting to the new current, or second, window.

In accordance with yet another alternative embodiment of the invention, in connection with operation of a web browser to fish for a site, upon terminating or giving up the search, the URL or other indicia of the site being search is temporarily highlighted, alternatively in a currently or previously displayed list of site URL's.

In accordance with another alternative embodiment, the temporally invasive function of the invention may be used in connection with a web browser, such as WebExplorer. In this instance, HTML text is available for scanning. When a user clicks on a particular url, the function of the invention scans the HTML text for other urls which are related in some way, and temporarily highlights them. This may also be done when returning from a web site: when the previous site's image is returned to the window, urls related to the one from which returned are temporarily highlighted, as to indicate where the user may want to go next. In this embodiment, which url's are related may be determined, for example, by matching characters up to the nth period or forward slash; or, by selection from an interest profile or synonym list. (For highlighting purposes, "NASA" may be made synonymous with "JPL", "Langley", "Ames", etc.) Further, temporary highlighting may be delayed until the relevant text gets scrolled into view.

In accordance with still another embodiment, wherever and whenever a mouse button is clicked, a tiny window is popped briefly into existence. Color, shading, shape and display time may be used to indicate which button or chord was pressed—and this popping may be done by starting a thread before going and doing whatever clicking the mouse would indicate.

In accordance with another embodiment of the invention, when part of a web browser window is displayed and the user happens to be entering text (not necessarily in the same window), the HTML of the web page is scanned for matches to the entered text, and the appropriate section of the browser window temporarily highlighted. Further, the web page may be scrolled to bring the highlighted section into view.

In accordance with another embodiment of the invention, with respect to an HTML environment where an image is contained on a reference anchor (so as to enable going to the reference by clicking on the image) and also text elsewhere pointing the same reference, of temporarily highlighting the image when the text is selected, and visa versa, and also upon returning.

In accordance with still a further embodiment of the invention, a medium such as a magnetic or optical storage or transmission device or the like is provided for storing or transmitting data structures or commands for controlling the operation of computer display according to the methods of the invention heretofore described.

Accordingly, the scope of protection of this invention is limited only by the following claims and their equivalents.

We claim:

1. A method for controlling a display device, comprising the steps of:
   displaying a plurality of display elements previously relayed to said display device pursuant to a host session application owning said display device;
   operating a second application not owning said display device to:
   capture a display indicia from said host session;
   determine if a display element corresponds to said display indicia, and if so temporarily highlight said display element for a predetermined length of time; and then
   relay said display indicia to said host session application for display.

2. A method of operating a computer having an input device and a visual display, comprising the steps of:
   pursuant to a primary session executing on behalf of an application owning said visual display,
   operating said visual display to display a first set of characters,
   operating said input device to input a set of input characters,
   pursuant to a temporally invasive function not owning said visual display,
   capturing and comparing said set of input characters with a second set of characters selected from said first set of characters to identify a match,
   upon identifying a match, temporarily altering the display of said second set of characters for a predetermined length of time; and
   relaying said set of input characters to said visual display.

3. A method of operating a computer display device, comprising the steps of:
   displaying for a host session application owning said display device a first plurality of characters relayed to said display device,
   capturing and testing within a temporally invasive function not owning said display device a second plurality of characters input to said host session for display,
   upon determining that said second plurality of characters is included within said first plurality of characters, altering said display device to highlight said included characters for a predetermined length of time.

4. A method of operating a computer display device, comprising the steps of:
   displaying a first plurality of characters input to an owner application owning said display device,
   capturing and testing within a temporally invasive function of an application not owning said display device a second plurality of characters input to said owner application for display, responsive to said temporally invasive function determining that said second plurality of characters is included within said first plurality of characters, temporarily altering said display device to highlight said included characters for a predetermined length of time and relaying said second plurality of characters to said owner application.

5. Apparatus for operating a computer display device, the apparatus including:

display means for displaying a first plurality of characters input to a host session, testing means for capturing and testing a second plurality of characters being input to said host session for display, temporally invasive means not owning said display device responsive to said testing means and said display means for temporarily altering for a predetermined length of time the display of a subset of said first plurality of characters upon determining that said second plurality of characters corresponds to said subset and relaying said second plurality of characters to said host sessions.

6. A memory device for storing program logic for controlling a display to temporarily alter the display of information subsequently entered at an input device, comprising:

temporally invasive code means not owning said display for capturing and parsing input characters entered at an input device, searching display characters being displayed on a display device to identify correspondence between said input characters and said display characters, responsive to said correspondence temporarily altering the display of said display characters for a predetermined length of time, and thereafter relaying said input characters for display.

7. A method of operating a computer having an input device and a visual display, comprising the steps of:

operating said visual display to display first set of characters, operating said input device to input a set of input characters, capturing and comparing within a temporally invasive function not owning said display device said first set of characters with a second set of characters selected from input characters to identify a match, upon identifying a match, temporarily altering for a predetermined length of time the display of characters in the first set of characters matching the second set of characters, and relaying said input characters to said visual display.

8. A method of operating a computer display device, comprising the steps of:

displaying a first plurality of characters, capturing within a temporally invasive function not owning said display device and testing a second plurality of characters input for display, upon determining that a subset of said second plurality of characters is included within said first plurality of characters, altering the display for a predetermined length of time to highlight said included characters, and thereafter relaying said second plurality of characters to said computer display device for display on behalf of an application owning said display device.

9. The method of claim 8 further comprising the steps responsive to determining that a plurality of subsets of said second plurality of characters is included within said first plurality of characters, of altering the display of a plurality of said sets.

10. The method of claim 9 wherein said altering step includes identifying the numerical instance of said sets in multiple screens.

11. A medium for storing a data structure for controlling the operation of a computer display device according to the steps of:

relaying a first plurality of characters to said computer display device for display, capturing within a temporally invasive function not owning said display and testing a second plurality of characters input for display, upon determining that said second plurality of characters is included within said first plurality of characters, temporarily altering the display to highlight said included characters for a predetermined length of time, and relaying said second plurality of characters to said computer display device for display.

12. A medium for transmitting a data structure for controlling the operation of a computer display according to the steps of:

displaying at said computer display a first plurality of characters on behalf of an application owning said computer display, operating a temporally invasive function not owning said computer display according to the steps of:
thereafter capturing and testing a second plurality of characters input for display,
upon determining that said second plurality of characters is included within said first plurality of characters, temporarily altering the display to highlight said included characters; and
thereafter relaying said second plurality of characters to said computer display for display.

* * * * *